United States Patent [19]

Badesha et al.

[11] Patent Number: 5,166,031
[45] Date of Patent: Nov. 24, 1992

[54] MATERIAL PACKAGE FOR FABRICATION OF FUSING COMPONENTS

[75] Inventors: Santokh S. Badesha, Pittsford; Robert M. Ferguson, Penfield; Louis D. Fratangelo, Fairport; George J. Heeks, Rochester; Arnold W. Henry, Pittsford; David H. Pan, Rochester, all of N.Y.

[73] Assignee: Xerox Corporation, Stamford, Conn.

[21] Appl. No.: 631,520

[22] Filed: Dec. 21, 1990

[51] Int. Cl.⁵ .................................................. G03G 5/20
[52] U.S. Cl. ........................................ 430/124; 430/98; 430/99; 355/285; 355/295; 428/418; 428/422; 428/906
[58] Field of Search .................. 430/99, 124, 98; 428/422, 418, 906; 355/285, 295; 528/24, 32; 524/866

[56] References Cited

U.S. PATENT DOCUMENTS

| | | | |
|---|---|---|---|
| 4,492,786 | 1/1985 | Evans et al. | 524/865 |
| 4,548,989 | 10/1985 | Allen et al. | 525/101 |
| 4,592,990 | 6/1986 | Takagi et al. | 430/137 |
| 4,853,737 | 8/1989 | Hartley et al. | 355/289 |
| 5,017,432 | 5/1991 | Eddy et al. | 428/422 |
| 5,035,927 | 7/1991 | Chen et al. | 427/444 |
| 5,061,965 | 10/1991 | Ferguson et al. | 355/284 |

*Primary Examiner*—Marion E. McCamish
*Assistant Examiner*—Rosemary Ashton

[57] ABSTRACT

A fuser member comprising a supporting substrate having an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator.

35 Claims, 1 Drawing Sheet

MATERIAL PACKAGE FOR FABRICATION OF FUSING COMPONENTS

CROSS REFERENCE TO RELATED APPLICATIONS

Attention is directed to the following copending applications assigned to the assignee of the present application. U.S. application Ser. No. 07/405,392, now U.S. Pat. No. 5,017,432, with an effective filing data of Sep. 11, 1989, entitled Fuser Member in the name of Clifford O. Eddy et al. U.S. application Ser. No. 07/516,950, now U.S. Pat. No. 5,061,965, filed Apr. 30, 1990 entitled Fusing Assembly With Release Agent Donor Member in the name of Robert M. Ferguson et al. Attention is also directed to commonly assigned U.S. Pat. No. 5,141,788 filed concurrently herewith, entitled Fuser Member in the name of Santokh S. Badesha et al.

BACKGROUND OF THE INVENTION

The present invention relates to a fuser member, a method of fusing toner images in electrostatographic reproducing apparatus and a method for fabricating the fuser member. In particular, it relates to a fuser member which may preferably take the form of a fuser roll, pressure roll or release agent donor roll.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 160° C. or higher depending upon the softening range of the particular resin used in the toner. It is undesirable, however, to raise the temperature of the substrate substantially higher than about 200° C. because of the tendency of the substrate to discolor at such elevated temperatures, particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip, affects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The so called "hot offset" occurs when the temperature of the toner is raised to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Particularly preferred fusing systems take the form of a heated cylindrical fuser roll having a fusing surface which is backed by a cylindrical pressure roll forming a fusing nip there between. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in a electrostatographic printing system.

One of the earliest and most successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks et al. While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing nonuniform delivery of release agent. Furthermore, as described in U.S. Pat. No. 4,777,087, additional deterioration of physical properties of silicone elastomers results from the oxidative crosslinking, particularly of a fuser roll at elevated temperatures.

A more recent development in fusing systems involves the use of fluoroelastomers as fuser members which have a surface with a metal containing filler, which interact with polymeric release agents having functional groups, which interact with the metal containing filler in the fluoroelastomer surface. Such fusing systems, fusing members and release agents, are described in U.S. Pat. No. 4,264,181 to Lentz et al., U.S. Pat. No. 4,257,699 to Lentz and U.S. Pat. No. 4,272,179 to Seanor, all commonly assigned to the assignee of the present invention as well as the two above referenced previously filed copending applications. Typically, the fluoroelastomers are (1) copolymers of vinylidenefluoride and hexafluoropropylene, and (2) terpolymers of vinylidene fluoride, hexafluoropropylene and tetrafluoroethylene. Commercially available materials include: Viton E430, Viton GF and other Viton designations as Trademarks of E. I. Dupont deNemours, Inc. as well as the Fluorel materials of 3M Company. The preferred curing system for these materials is a nucleophilic system with a bisphenol crosslinking agent to generate a covalently crosslinked network polymer formed by the application of heat following basic dehydrofluorination of the copolymer. Exemplary of such fuser member is an aluminum base member with a poly(vinylidenefluoride-hexafluoropropylene) copolymer cured with a bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high rates of speed of electrostatographic reproducing machines.

While the mechanism involved in not completely understood, it has been observed that when certain polymeric fluids having functional groups are applied to the surface of a fusing member having an elastomer surface with a metal oxide, metal salt, metal, metal alloy or other suitable metal compounds dispersed therein there is an interaction (a chemical reaction, coordination complex, hydrogen bonding or other mechanism) between the metal of the filler in the elastomer and the polymeric fluid having functional groups so that the polymeric release agent having functional groups in the form of a liquid or fluid provides an excellent surface for release which having an excellent propensity to remain upon the surface of the fuser member. Regardless of the mechanism, there appears to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal of the elastomer containing metal leads to an overall diminution of the critical or high surface energy of the metal in the metal containing filler.

The preferred elastomers are the fluoroelastomers and the most preferred fluoroelastomers are the vinylidenefluoride based fluoroelastomers which contain hexafluoropropylene and tetrafluoroethylene as comonomers. Two of the most preferred fluoroelastomers are (1) a class of copolymers of vinylidenefluoride and hexafluoropropylene known commercially as Viton A and (2) a class of terpolymers of vinylidenefluoride, hexafluoropropylene and tetrafluoroethylene known commercially as Viton B. Viton A and Viton B and other Viton designations are trademarks of E. I. DuPont deNemours and Company. Other commercially available materials include Fluorel of 3M Company, Viton GH, Viton E60C, Viton B 910, and Viton E 430. The preferred curing system is a nucleophilic system with a bisphenol crosslinking agent to generate a covalently cross-linked network polymer formed by the application of heat following basic dehydrofluorination of the copolymer. The nucleophilic curing system also includes an organophosphonium salt accelerator. Some of the commercially available fluoroelastomer polymers which can be cured with the nucleophilic system are Viton E 60C, Viton B 910, Viton E 430, Viton A, Viton B, Viton GF.

The use of polymeric release agents having functional groups which interact with a fuser member to form a thermally stable, renewable self-cleaning layer having superior release properties for electroscopic thermoplastic resin toners is described in U.S. Pat. No. 4,029,827 to Imperial et al., 4,101,686 to Strella et al. and 4,185,140 also to Strella et al. all commonly assigned to the assignee of the present invention. In particular, U.S. Pat. No. 4,029,827 is directed to the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids.

While the mechanism involved in these fusing systems is not completely understood, it has been observed that when certain polymeric fluids having functional groups are applied to the surface of a fusing member having an elastomer surface with a metal oxide, metal salt, metal, metal alloy or other suitable metal compounds dispersed therein, there is an interaction (a chemical reaction, coordination complex, hydrogen bonding or other mechanism) between the metal ion of the filler in the elastomer and the polymeric fluid having functional groups so that the polymeric release agent having functional groups in the form of a liquid or fluid provides an excellent surface for release which having an excellent propensity to remain upon the surface of the fuser member. Regardless of the mechanism there appears to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal ion of the elastomer containing metal leads to an overall diminution of the critical or high surface energy of the metal in the metal containing filler.

While these fluoroelastomers have excellent mechanical and physical properties in that they typically have a long wearing life maintaining toughness and strength over time in a fusing environment, they can only be used with very expensive functional release agents and have to contain expensive interactive metal containing fillers. Typically, for example, the functional release agents are of the order of four times as expensive as their nonfunctional conventional silicone oil release agents.

PRIOR ART

Attempts have been made to combine the advantages of each of these fusing systems.

"Improving Release Performance of Viton Fuser Rolls", by Henry et al., Xerox Disclosure Journal, Volume 9, #1, January/February 1984, discloses a fuser member made of a copolymer of vinylidenefluoride and hexafluoropropylene which has a tendency to react with the toner charge control agent producing increased crosslinking and thereby hardening as the double bonds of the fluoroelastomer become saturated to prevent further crosslinking by the addition of a silanic hydrogen compound, such as polymethylhydrosiloxane to covalently bond the siloxane to the surface of this fluoroelastomer and thereby prevent further hardening, and in addition provide good release characteristics.

"Viton/RTV Silicone Fuser Release Overcoating", Ferguson et al., Xerox Disclosure Journal, Volume 11, #5, September/October 1986, describes a fusing member wherein a fluoroelastomer such as a copolymer of vinylidenefluoride and hexafluoropropylene and an RTV Silicone Rubber are co-dissolved, co-sprayed and co-cured on an aluminum substrate to provide a uniform dispersion of silicone within the fluoroelastomer matrix. Such a fuser surface is described as having the mechanical strength of the fluoroelastomer and the release properties of the silicone and may be used with traditional dimethyl silicone release fluids.

U.S. Pat. No. 4,853,737, to Hartley et al. describes a fuser roll comprising a cured fluoroelastomer containing pendant diorganosiloxane segments that are covalently bonded to the backbone of the fluoroelastomer. The siloxane is appended to the fluoroelastomer by adding to the composition to be cured a polydiorganosiloxane oligomer having functional groups such as phenoxy or amino groups to form the covalent bond. The fuser member preferably has a metal oxide containing filler to react with functional release agent.

SUMMARY OF THE INVENTION

In a principle aspect of the present invention, the fuser member and fusing system employing the same has an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator.

In a further aspect of the present invention, the fluoroelastomer is selected from the group consisting of poly(vinylidene fluoridehexafluoropropylene) and poly(vinylidene-hexafluoropropylene-tetrafluoroethylene).

In a further aspect of the present invention, the polyorganosiloxane has the formula:

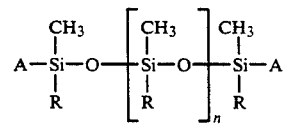

where R is an alkyl, alkenyl or aryl having less than 19 carbon atoms or an aryl group substituted with an amino, hydroxy, mercapto or alkyl or alkenyl group having less than 19 carbon atoms. The functional group A, is an alkene or alkyne having 2 to 8 carbon atoms or an alkene or alkyne substituted with an alkyl or aryl having less than 19 carbon atoms and n is 2 to 350.

In accordance with a principle aspect of the present invention, a long life user member together with a method of making the fuser member and a fusing system in which it may be used is provided which does not require the use of functional release agents or the presence of metal containing fillers in the fuser member to interact with the functional release agent.

In a further aspect of the present invention, the dehydrofluorinating agent is selected from the group consisting of primary, secondary and tertiary aliphatic and aromatic amines where the aliphatic and aromatic groups have from 2 to 15 carbon atoms, and aliphatic and aromatic diamines and triamines, having from 2 to 15 carbon atoms.

In a further aspect of the present invention the dehydrofluorinating agent is a primary aliphatic amine such as an alkyl amine having up to 19 carbon atoms.

In a further aspect of the present invention on the polymerization initiator is selected from the group consisting of free radical initiators with benzoyl peroxide and azo-bis-isobutyronitrile being preferred.

In a further aspect of the present invention, the supporting substrate is a cylindrical sleeve, having an outer layer of from 12.5 to about 125 micrometers thick.

In a further aspect of the present invention, the fuser member includes an intermediate elastomer layer such as a silicone or fluoroelastomer layer and the volume grafted layer is an overcoating.

In a further aspect of the present invention, the fuser member is used as pressure roll, fuser roll or release agent donor roll.

Figure 1:
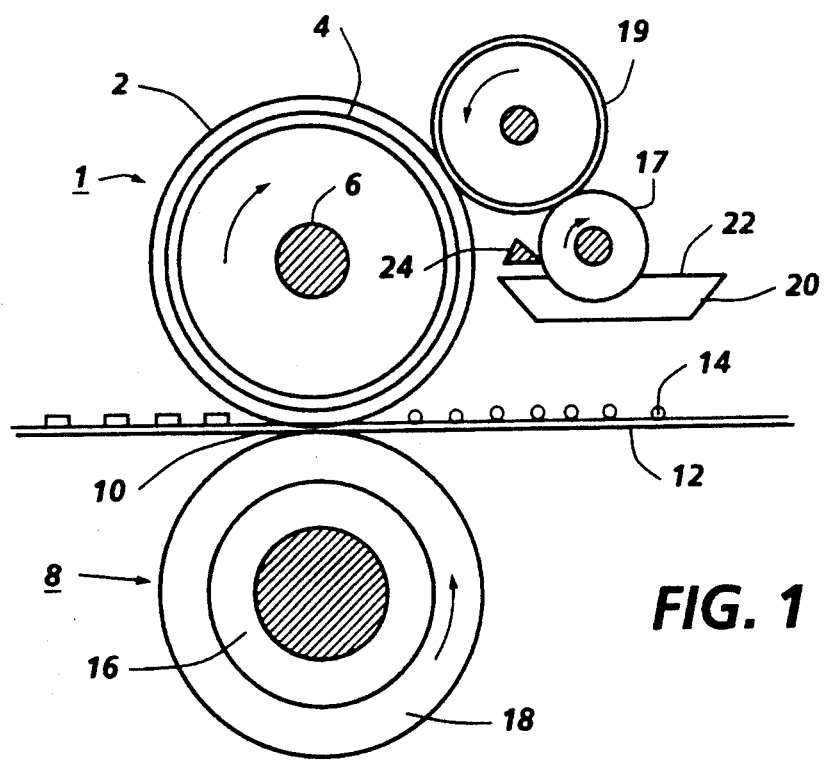
FIG. 1 is a sectional view of a fuser system which may use the fuser member of the present invention.

By the term volume graft, it is intended to define a substantially uniform integral interpenetrating network of a hybrid composition, wherein both the structure and the composition of the fluoroelastomer and polyorganosiloxane are substantially uniform when taken through different slices of the fuser member.

The term interpenetrating network is intended to define the addition polymerization matrix where the fluoroelastomer and polyorganosiloxane polymer strands are intertwined in one another.

The term hybrid composition is intended to define a volume grafted composition which is comprised of fluoroelastomer and polyorganosiloxane blocks randomly arranged.

DETAILED DESCRIPTION OF THE PRESENT INVENTION

A typical fuser member of the present invention is described in conjunction with a fuser assembly as shown in FIG. 1 where the numeral 1 designates a fuser roll comprising elastomer surface 2 upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24 a layer of polymeric release fluid can be applied initially to delivery roll 19 and subsequently to elastomer 2 in controlled thickness ranging from submicrometer thickness to thickness of several micrometers of release fluid. Thus, by metering device 24, about 0.1 to 2 micrometers or greater thickness of release fluid can be applied to the surface of elastomer 2.

As used herein, the term fuser member may be a roll, belt, flat surface or other suitable shape used in the fixing of thermoplastic toner images to a suitable substrate. It may take the form of a fuser member, a pressure member or a release agent donor member, preferably in the form of a cylindrical roll. Typically, the fuser member is made of a hollow cylindrical metal core, such as copper, aluminum, steel and the like, and has an outer layer of the selected cured fluoroelastomer. Alternatively, there may be one or more intermediate layers between the substrate and the outer layer of the cured elastomer if desired. Typical materials having the appropriate thermal and mechanical properties for such layers include silicone elastomers, fluoroelastomers, EPDM and Teflon PFA sleeved rollers.

The volume grafting according to the present invention is performed in two steps, the first involves the dehydrofluorination of the fluoroelastomer preferably using an amine. During this step hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer.

The fluoroelastomers useful in the practice of the present invention are those described in detail in the above referenced U.S. Pat. No. 4,257,699 to Lentz, as well as those described in commonly assigned copending application Ser. No. 07/405,392 and 07/516,950. As described therein these fluoroelastomers, particularly from the class of copolymers and terpolymers of vinylidenefluoride hexafluoropropylene and tetrafluoroethylene, known commercially under various designations as Viton A, Viton E, Viton E60C, Viton E430, Viton 910, Viton GH and Viton GF. The Viton designation is a Trademark of E.I. Dupont deNemours, Inc. Other commercially available materials include Fluorel 2170, Fluorel 2174, Fluorel 2176, Fluorel 2177 and Fluorel LVS 76, Fluorel being a Trademark of 3M Company. Additional commercially available materials include Aflas a poly(propylene-tetrafluoroethylene), Fluorel II (LII900) a poly(propylene-tetrafluoroethylene-vinylidenefluoride) both also available from 3M Company as well as the Tecnoflons identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Patent, and in Ser. No. 07/405,392.

In a particularly preferred embodiment, the fluoroelastomer is one having a relatively low quantity of vinylidenefluoride, such as in Viton GF, available from E.I. Dupont deNemours, Inc. The Viton GF has 35 mole percent vinylidenefluoride, 34 percent hexafluoropropylene and 29 mole percent tetrafluoroethylene with 2 percent cure site monomer. It is generally cured with a conventional aliphatic peroxide curing agent.

The polyorganosiloxane having functionality according to the present invention has the formula:

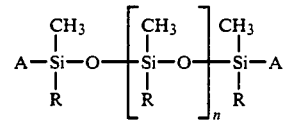

where R is an alkyl, alkenyl or aryl having less than 19 carbon atoms or an aryl group substituted with an amino, hydroxy, mercapto or an alkyl or alkenyl group having less than 19 carbon atoms. The functional group A, is an alkene or alkyne group having 2 to 8 carbon atoms or an alkene or alkyne substituted with an alkyl or aryl group having less than 19 carbon atoms and n is 2 to 350. In the above formula, typical R groups include methyl, ethyl, propyl, octyl, vinyl, allylic crotnyl, phenyl, naphthyl and phenanthryl and typical substituted aryl groups are substituted in the ortho, meta and para positions with lower alkyl groups having less than 15 carbon atoms. Furthermore, in a preferred embodiment n is between 60 and 80 to provide a sufficient number of reactive groups to graft onto the fluoroelastomer. Typical alkene and alkenyl functional groups include vinyl, acrylic, crotonic and acetenyl which may typically be substituted with methyl, propyl, butyl, benzyl, and tolyl groups etc.

The dehydrofluorinating agent which attacks the fluoroelastomer generating unsaturation is selected from the group of strong nucleophilic agents such as peroxides, hydrides, bases, oxides, etc. The preferred agents are selected from the group consisting of primary, secondary and tertiary, aliphatic and aromatic amines, where the aliphatic and aromatic groups have from 2 to 15 carbon atoms. It also includes aliphatic and aromatic diamines and triamines having from 2 to 15 carbon atoms where the aromatic groups may be benzene, toluene, naphthalene or anthracene etc. It is generally preferred for the aromatic diamines and triamines that the aromatic group be substituted in the ortho, meta and para positions. Typical substituents include lower alkylamino groups such as ethylamino, propylamino and butylamino with propylamino being preferred. Specific amine dehydrofluorinating agents include N-(2 aminoethyl-3-aminopropyl)-trimethoxy silane, 3-(N-strylmethyl-2-aminoethylamino) propyltrimethoxy silane hydrochloride and (aminoethylamino methyl) phenethyltrimethoxy silane.

Other adjuvants and fillers may be incorporated in the elastomer in accordance with the present invention as long as they do not affect the integrity of the fluoroelastomer. Such fillers normally encountered in the compounding of elastomers include coloring agents, reinforcing fillers, crosslinking agents, processing aids, accelerators and polymerization initiators. Following coating of the fluoroelastomer on the substrate, it is subjected to a step curing process at about 38° C. for 2 hours followed by 4 hours at 77° C. and 2 hours at 177° C.

The dehydrofluorinating agent generates double bonds by dehydrofluorination of the fluoroelastomer compound so that when the unsaturated functionally terminated polyorganosiloxane is added with the initiator, the polymerization of the siloxane is initiated. Typical free radical polymerization initiators for this purpose are benzoyl peroxide and azoisobutyronitrile, AIBN.

The substrate for the release agent donor member according to the present invention may be of any suitable material. Typically, it takes the form of a cylindrical tube of aluminum, steel or certain plastic materials chosen to maintain rigidity, instructural integrity, as well as being capable of having the silicone elastomer coated thereon and adhered firmly thereto. Typically, the fuser members may be made by injection, compression or transfer molding, or they may be extruded. In a typical procedure the core which may be a steel cylinder is degreased with a solvent and cleaned with an abrasive cleaner prior to being primed with a primer such as Dow Corning 1200 which may be sprayed, brushed or dipped followed by air drying under ambient conditions for thirty minutes and then baked at 150° C. for 30 minutes. A silicone elastomer intermediate layer may be applied according to conventional techniques such as injection molding and casting after which it is cured for up to 15 minutes and at 120 to 180 degrees Centigrade to provide a complete cure without a significant post cure operation. This curing operation should be substantially complete to prevent debonding of the silicone elastomer from the core when it is removed from the mold. Thereafter the surface of the silicone elastomer is sanded to remove the mold release agent and it is wiped clean with a solvent such as Isopropyl alcohol to remove all debris.

The outer layer of the fuser member is preferably prepared by dissolving the fluoroelastomer in a typical solvent, such as methyl ethyl ketone, methyl isobutyl ketone and the like, followed by stirring for 15 to 60 minutes at 45°-85° C. after which the polymerization initiator which is generally dissolved in an aromatic solvent, such as toluene is added with continued stirring for 5 to 25 minutes. Subsequently, the polyorganosiloxane is added with stirring for 30 minutes to 10 hours at a temperature of 45°-85° C. A nucleophilic curing agent such as, Viton Curative No. 50, which incorporates an accelerator, (a quarternaryphosphonium salt or salts) and a crosslinking agent, bisphenol AF in a single curative system is added in a 3 to 7 percent solution predissolved in the fluoroelastomer compound. Optimally, the basic oxides, MgO and Ca(OH)$_2$ can be added in particulate form to the solution mixture. Providing the layer on the fuser member substrate is most conveniently carried out by spraying, dipping or the like a solution of the homogeneous suspension of the fluoroelastomer and polyorganosiloxane to a level of film of about 12.5 to about 125 micrometers in thickness. This thickness range is selected as providing a layer thin enough to prevent a large thermal barrier for fusing and thick enough to allow a reasonable wear life. While molding, extruding and wrapping techniques are alternative means which may be used, we prefer to spray successive applications of the solvent solution. When the desired thickness of coating is obtained, the coating is cured and thereby bonded to the roll surface. A typical step curing process is heating for two hours at 93° C. followed by 2 hours at 149° C. followed by 2 hours at 177° C. followed by 2 hours at 208° C. and 16 hours at 232° C.

In an alternative procedure, the solvent maybe removed by evaporation by known means, the residue rinsed with a hydrocarbon solvent such as hexane to remove unwanted reactants, if any, and the residue redesolved in the original solvent followed by the addition of Curative No. 50 and the subsequent formation of the outer layer.

The following Examples further define and describe fuser members prepared by the present invention and illustrate preferred embodiment of the present invention. Unless otherwise indicated, all parts and percentages are by weight. Examples II is for comparison purposes.

EXAMPLE I

An aluminum cylindrical sleeve was abraided with sand paper, followed by degreasing, scrubbing with an abrasive cleaner and thoroughly washing with water. A primer Dow Corning primer DC1200 was applied to a thickness of 2 to 3 tenths of a mil. (5 to 7.5 micrometer), air dried at ambient conditions for 30 minutes and baked at 150° C. for 30 minutes. Subsequently, the primed core was provided with an intermediate layer of a liquid injection molded silicone elastomer by molding Dow Corning LSR590 to the primed core to a thickness of about 0.25 inches. The silicone elastomer was cured for 10–15 minutes at 150° C. but was not post cured. Following removal of the roll from the mold, the mold release material was sanded off and the roll was cleaned with isopropyl alcohol. Part A was prepared by dissolving 250 g of Viton GF in 2.5 liters of methylethyl ketone (MEK) by stirring at room temperature. This is accomplished by using a four litre plastic bottle and a moving base shaker. It takes approximately one hour to two hours to accomplish the dissolution depending upon the speed of the shaker. The above solution is then transferred to a four liter Erlenmyer flask and 25 ml of the amine dehydrofluorinating agent, 3-(N-strylmethyl-2-aminoethylamino) propyltrimethoxysilane hydrochloride (S-1590, available from Huls America Inc. Piscataway, N.J.) was added. The contents of the flask were then stirred using a mechanical stirrer while maintaining the temperature between 55 and 60 degrees centrigrade. After stirring for 30 minutes, 50 ml of 100 centistoke vinyl terminated polysiloxane (PS-441) also available from Huls America Inc. was added and stirring continued for another ten minutes. A solution of 10 g of benzoyl peroxide in a 100 ml. mixture of toluene and MEK (80:20) was then added. The stirring was continued while heating the contents of the flask around 55 degree centrigrade for another 2 hours. During this time the color of the solution turned light yellow which then was poured into an open tray. The tray was left in the hood overnight (16 hours). The resulting yellow rubbery mass left after the evaporation of the solvent was then cut into small pieces with a sissor. This material was then extracted extensively and repeatedly with 1500 ml. (three 500 ml. portions) of n-hexane to remove unreacted Siloxane.

Next 54.5 grams of Part A, the silicone grafted fluoroelastomer, together with 495 parts of methyl isobutyl ketone were added to a roll mill without media and rolled 17–24 hours until dissolved. Subsequently, 2.5 grams of Dupont Curative VC50 catalyst crosslinker in 22.5 parts of methyl ethyl ketone, were added to the above part A, shaken for about 15 minutes and the solids content reduced to 5–7 percent by the addition of methyl isobutyl ketone. Following hand mixing, the mixture was air sprayed on to a silicone elastomer layer to a dry thickness of about 1.5 mils. (40 micrometer) and cured in ambient dry air for 24 hours followed by the above mentioned post step curing procedure. The roll was characterized as follows:

X-ray Photoelectron Spectroscopy Characterization of the Volume Grafted Surface

1. Preparation of Surface

The volume grafted surface was sequentially extracted with hexane or 90/10 hexane/methyl ethyl ketone mixed solvent 3–4 times to remove unreacted fluoroelastomer and siloxane.

2. XPS Characterization

The extracted surface was then examined with X-ray photoelectron spectroscopy which provide the chemical composition of the topmost 5–10 nanometers surface layer. The surface was then sliced two times and XPS analysis indicated that polysiloxane is uniformly distributed through the fluoroelastomer film.

Two rolls so fabricated, were used as release agent donor rolls for supplying conventional silicone oil release agent in a Xerox 5090 test fixture. Both donor rolls showed long life, one over 2.8 million copies and the other over 4.3 million copies, excellent transport ability, no toner contamination and no sign of physical or chemical degradation. The tests were suspended at 2.8 and 4.3 million copies respectively without failure. Furthermore, the toner used in the test contained distearyl dimethyl ammonia methyl sulfate (DDAMS), as described in U.S. Pat. No. 4,560,635, a charge enhancing additive which is known to produce hardening of the fuser member and subsequent oxidation, producing increased surface energy and irregular wearing of the fuser surface as noted in the above referenced application Ser. No. 07/405,392. This charge enhancing additive appeared to have no affect on the donor roll.

EXAMPLE II

By comparison a plain silicone elastomer donor roll made from a primed core having a coating of General Electric Liquid Injection Molding 2700 with 35 parts of 100 centistoke conventional nonfunctional silicone oil per 100 parts of the LIM 2700 to a thickness of 0.25 inches experienced failure as a result of nonuniform swell and chunking out of the weakened material. The normal life of this standard roll is 1.5 million copies.

EXAMPLE III

A fuser roll was prepared as follows. An aluminum core was grit blasted and degreased with solvent, dried and primed with the epoxy adhesive Thixon 300/301 over which a base coat comprising part A which is 100 parts of Viton GF, 30 parts of N990 carbon black 15 parts Maglite Y(MgO) in methyl isobutyl ketone to a 15% solids mixture and part B which is 5 parts of duPont C-50 Curative in 28.3 parts of methyl isobutyl ketone. Part B was added to part A and roll milled for 45 minutes, sprayed onto the primed core to a thickness of 6 mils after which it was desolvated at ambient conditions for two days followed by a step cure of 2 hours at 38° C., 4 hours at 77° C., 2 hours at 177° C., and the sprayed surface layer sanded to a thickness of 5.5 mils. Next 250 g of Viton GF was dissolved in 2.5 liter of methylethyl ketone (MEK) by stirring at room temperature. This is accomplished by using a four liter plastic bottle and a moving base shaker. It takes approximately one hour to two hours to accomplish the dissolution depending upon the speed of the shaker. The above solution is then transferred to a 4 liter Erlenmyer flask and 25 ml of the amine dehydrofluorinating agent N-(2-aminoethyl-3 aminopropyl)-trimethoxy silane (A0700, available from Huls America Inc. Piscataway, N.J.) was added. The contents of the flask were then stirred using a mechanical stirrer while maintaining the temperature between 55 and 60 degrees centigrade. After stirring for 30 minutes, 50 ml of vinyl terminated poly siloxane (PS-441) was added and stirring continued for another ten minutes. A solution of 10 g of benzoyl peroxide in a 100 ml mixture of toluene and MEK (80:20) was then added. The stirring was continued while heating the contents of the flask around 55 degree centigrade for another 2 hours. During this time the color of the solution turned light yellow. To this solution nucleophilic curing agent such as, Viton Curative No. 50 which incorporates an accelerator (a quarternary phosphonium salt or salts) and a crosslinking agent, bisphenol AF in a single curative system is added in a 3 to 7 percent solution. The outer layer of the fuser roll was spray coated to a thickness of 2 mils using the above solution and cured according to Example 1. When the above roll is used in a fusing system as a fuser roll with nonfunctional release agent and no metal oxide filler, it has proven to provide satisfactory fusing and release performance to 120,000 copies. The same X-ray Photoelectron Spectroscopy Characterization was performed on this fuser roll with similar results namely uniform distribution of the polysiloxane throughout the film.

Experience has also indicated that when a donor roll made from a fluoroelastomer, such as Viton GF is used in fusing system transporting nonfunctional release agent fluid to the fuser member, a failure would be experienced before about 15,000 copies by failure in the print releasing and stripping from the fuser roll and instead wrapping around the fuser roll. Furthermore, such a roll when used as a pressure roll has found to exhibit excessive contamination of toner and poor release at about 2000 copies.

Thus, according to the present invention, a long life fuser member has been provided which is capable of use as a fuser roll, donor roll or pressure roll, in a fusing system which does not require the use of functional release agent or the presence of a metal containing filler in the transport surface of the fuser member to interact with the functional release agent to form a release layer. This enables an economical fusing system combining the advantages of fluoroelastomer fuser member surfaces and nonfunctional conventional silicone release agent.

All the patents and applications referred to herein are hereby specifically, and totally incorporated herein by reference in their entirety in the instant specification.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A fuser member comprising a supporting substrate having an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator.

2. The fuser member of claim 1 wherein said fluoroelastomer is selected from a group consisting of poly(-vinylidene fluoride-hexafluoropropylene) and poly(-vinylidene fluoride-hexafluoropropylene-tetrafluoroethylene).

3. The fuser member of claim 1 wherein said polyorganosiloxane has the formula:

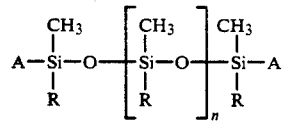

where R is an alkyl, alkenyl or aryl having less than 19 carbon atoms or an aryl group substituted with an amino, hydroxy, mercapto or alkyl or alkenyl group having less than 19 carbon atoms, the functional group A is an alkene or alkyne having 2 to 8 carbon atoms or an alkene or alkyne substituted with an alkyl or aryl having less than 19 carbon atoms and n is 2 to 350.

4. The fuser member of claim 1 wherein said dehydrofluorinating agent is selected from the group consisting of primary, secondary and tertiary aliphatic and aromatic amines where the aliphatic and aromatic groups have from 2 to 15 carbon atoms and aliphatic and aromatic diamines and triamines having from 2 to 15 carbon atoms.

5. The fuser member of claim 4 wherein said amine dehydrofluorinating agent is selected from the group consisting of N-(2 aminoethyl-3-aminopropyl)-trimethoxy silane, 3-(N-styrylmethyl-2-aminoethylamino) propyltrimethoxy silane hydrochloride and (aminoethylamino methyl) phenethyltrimethoxy silane.

6. The fuser member of claim 1 wherein the polymerization initiator is a peroxide.

7. The fuser member of claim 1 wherein the initiator is selected from the group consisting of benzoyl peroxide and azo-bis-isobutyronitrile.

8. The fuser member of claim 1 wherein said outer layer is from about 12.5 to about 125 micrometers thick.

9. The fuser member of claim 8 wherein said member is a pressure roll, fuser roll or release agent donor roll.

10. The method of claim 9 wherein said outer layer is from about 12.5 to about 125 micrometers thick.

11. The method of claim 9 wherein said supporting substrate is a cylindrical sleeve.

12. The fuser member of claim 1 wherein said supporting substrate is a cylindrical sleeve.

13. The fuser member of claim 12 including an intermediate elastomer layer.

14. The method of fusing a thermoplastic resin toner image to a substrate comprising forming a film of a polymeric release agent on the surface of a heated fuser member comprising a supporting substrate having an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane, and a polymerization initiator and contacting the toner image on said substrate with the heated fuser member for a period of time sufficient to soften the toner, and allowing the toner to cool.

15. The method of claim 14 wherein said fluoroelastomer is selected from a group consisting of poly(-vinylidenefluoride-hexafluoropropylene) and poly(-vinylidenefluoride-hexafluoropropylene-tetrafluoroethylene).

16. The method of claim 14 wherein said polyorganosiloxane has the formula:

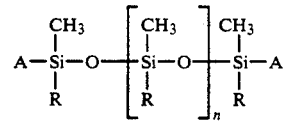

where R is an alkyl, alkenyl or aryl having less than 19 carbon atoms or an aryl group substituted with an amino, hydroxy, mercapto or alkyl or alkenyl group having less than 19 carbon atoms, the functional group A is an alkene or alkyne having 2 to 8 carbon atoms or an alkene or alkyne substituted with an alkyl or aryl having less than 19 carbon atoms and n is 2 to 350.

17. The method of claim 14 wherein said dehydrofluorinating agent is selected from the group consisting of primary, secondary and tertiary aliphatic and aromatic amines where the aliphatic and aromatic groups have from 2 to 15 carbon atoms and aliphatic and aromatic diamines and triamines having from 2 to 15 carbon atoms.

18. The method of claim 17 wherein said amine dehydrofluorinating agent is selected from the group consisting of N-(2-aminoethyl-3-aminopropyl)-trimethoxy silane, 3-(N-styrylmethyl-2-aminoethylamino) propyltrimethoxy silane hydrochloride and (aminoethylamino methyl) phenethyltrimethoxy silane.

19. The method of claim 14 wherein the polymerization initiator is a peroxide.

20. The fuser member of claim 14 wherein the initiator is selected from the group consisting of benzoyl peroxide and azo-bis-isobutryonitrile.

21. The method of claim 20 including an intermediate elastomer layer.

22. The method of claim 20 wherein said member is a pressure roll, fuser roll or release agent donor roll.

23. The method of claim 14 wherein said release agent is a nonfunctional polymeric release agent.

24. The method of claim 14 wherein said release agent is a functional polymeric release agent.

25. The method of making a fuser member comprising; forming a solvent solution of a fluoroelastomer compound, dehydrofluorinating agent, a polymerization initiator and an alkene or alkyne functionally terminated polyorganosiloxane, adding a nucleophilic curing agent for said fluoroelastomer to said solution, applying said solution to a fuser member support substrate, curing said fluoroelastomer compound and said polyorganosiloxane to form an outer layer on said substrate of a volume grafted elastomer which is a substantially uniform integral interpenetrating network of a hybrid composition of said fluoroelastomer and said polyorganosiloxane, said volume graft having been formed by dehydrofluorination of said fluoroelastomer with a nucleophilic dehydrofluorinating agent, followed by addition polymerization by the addition of an alkene or alkyne functionally terminated polyorganosiloxane and a polymerization initiator.

26. The method of claim 25 wherein said fluoroelastomer is selected from the group consisting of poly(-vinylidenefluoride-hexafluoropropylene) and poly(-vinylidene fluoride-hexafluoropropylene-tetrafluoroethylene).

27. The method of claim 25, wherein said polyorganosiloxane has the formula:

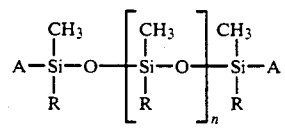

where R is an alkyl, alkenyl or aryl having less than 19 carbon atoms or an aryl group substituted with an amino, hydroxy, mercapto or alkyl or alkenyl group having less than 19 carbon atoms, the functional group A is an alkene or alkyne having 2 to 8 carbon atoms or an alkene or alkyne substituted with an alkyl or aryl having less than 19 carbon atoms and n is 2 to 350.

28. The claim 27 wherein said member is a pressure roll, fuser roll or release agent donor roll.

29. The method of claim 25 wherein said dehydrofluorinating agent is selected from the group consisting of primary, secondary and tertiary aliphatic and aromatic amines where the aliphatic and aromatic groups have from 2 to 15 carbon atoms and aliphatic and aromatic diamines and triamines having from 2 to 15 carbon atoms.

30. The method of claim 29 wherein said amine dehydrofluorinating agent is selected from the group consisting of N-(2-aminoethyl-3-aminopropyl)-trimethoxy silane, 3-(N-styrylmethyl-2-aminoethylamino) propyltrimethoxy silane hydrochloride and (aminoethylamino methyl) phenethyltrimethoxy silane.

31. The method of claim 25 wherein the polymerization initiator is a peroxide.

32. The fuser member of claim 25 wherein the initiator is selected from the group consisting of benzoyl peroxide and azo-bis-isobutyronitrile.

33. The method of claim 25 wherein said outer layer is from about 12.5 to about 125 micrometers thick.

34. The method of claim 25 wherein said supporting substrate is a cylindrical sleeve.

35. The method of claim 34 including forming an intermediate elastomer layer on said substrate.

* * * * *